United States Patent
Dinh et al.

(10) Patent No.: US 11,593,084 B2
(45) Date of Patent: Feb. 28, 2023

(54) CODE DEVELOPMENT FOR DEPLOYMENT ON A CLOUD PLATFORM

(71) Applicant: Dell Products L.P., Round Rock, TX (US)

(72) Inventors: Hung Dinh, Austin, TX (US); Rajesh Krishnan, Bangalore (IN); Pallavi Jaini, Shrewsbury, MA (US); Puttaraju Chikkanna, Bangalore (IN); Nikhil Reddy Kota, Round Rock, TX (US); Madhu Chilipi, Leander, TX (US); Venkat S. Ramachandran, Round Rock, TX (US); Navin Kumar, Bangalore (IN); Nithiyanandham Tamilselvan, Salem (IN); Naga Kalyan Kambapu, Austin, TX (US); Desai Yarlagadda, Hyderabad (IN); Lakshmi Prasad Banala, Round Rock, TX (US); Shubham Gupta, Jaipur (IN); Reddeppa Kollu, Leander, TX (US); Sabu K. Syed, Austin, TX (US); Anubhab Mohanty, Cuttack (IN); Vibhor Sharma, Alwar (IN); Md Shadab Ali, Nawada (IN)

(73) Assignee: Dell Products L.P., Round Rock, TX (US)

( * ) Notice: Subject to any disclaimer, the term of this patent is extended or adjusted under 35 U.S.C. 154(b) by 279 days.

(21) Appl. No.: 16/670,460

(22) Filed: Oct. 31, 2019

(65) Prior Publication Data
US 2021/0132935 A1    May 6, 2021

(51) Int. Cl.
*G06F 8/65*    (2018.01)
*G06F 8/36*    (2018.01)
(Continued)

(52) U.S. Cl.
CPC ............ *G06F 8/65* (2013.01); *G06F 8/36* (2013.01); *G06F 8/75* (2013.01); *G06F 9/4411* (2013.01)

(58) Field of Classification Search
None
See application file for complete search history.

(56) References Cited

U.S. PATENT DOCUMENTS

| 7,216,160 B2 * | 5/2007 | Chintalapati | G06F 11/3409 713/153 |
| 8,578,076 B2 * | 11/2013 | van der Linden | H04L 69/08 709/227 |

(Continued)

OTHER PUBLICATIONS

Tizzei, Leonardo P., et al. "Using microservices and software product line engineering to support reuse of evolving multi-tenant saas." Proceedings of the 21st International Systems and Software Product Line Conference—vol. A. 2017. (Year: 2017).*

(Continued)

*Primary Examiner* — Matthew J Brophy
(74) *Attorney, Agent, or Firm* — Ryan, Mason & Lewis, LLP

(57) ABSTRACT

A method includes receiving code for computer programming, analyzing the code and extracting a plurality of configuration properties from the code. In the method, one or more configuration files are generated from the extracted plurality of configuration properties, and microservice code is generated from the one or more configuration files. The microservice code is configured for deployment on one or more cloud computing platforms.

20 Claims, 11 Drawing Sheets

(51) Int. Cl.
　　　*G06F 9/4401*　　　(2018.01)
　　　*G06F 8/75*　　　　(2018.01)

(56) References Cited

U.S. PATENT DOCUMENTS

| | | | | |
|---|---|---|---|---|
| 10,230,571 | B2* | 3/2019 | Rangasamy | H04L 41/00 |
| 10,425,350 | B1* | 9/2019 | Florissi | H04L 47/762 |
| 10,521,284 | B2* | 12/2019 | McClory | H04L 63/0281 |
| 10,541,938 | B1* | 1/2020 | Timmerman | H04L 43/065 |
| 10,545,738 | B1* | 1/2020 | Jaeger | G06F 8/427 |
| 10,574,736 | B2* | 2/2020 | Kulp | H04L 67/10 |
| 10,691,514 | B2* | 6/2020 | McClory | G06F 8/41 |
| 10,841,392 | B2* | 11/2020 | Walsh | G06F 16/907 |
| 10,855,794 | B2* | 12/2020 | Walsh | G06N 20/00 |
| 10,860,390 | B2* | 12/2020 | Sukhomlinov | G06F 9/5072 |
| 10,866,918 | B2* | 12/2020 | Maturana | G06F 13/1668 |
| 11,061,748 | B2* | 7/2021 | Moukaddem | G06F 8/60 |
| 11,074,165 | B2* | 7/2021 | Khakare | G06F 8/35 |
| 11,099,976 | B2* | 8/2021 | Khakare | G06F 3/0486 |
| 11,467,888 | B2* | 10/2022 | Sukhomlinov | G06F 9/5038 |
| 2011/0265081 | A1* | 10/2011 | Lucovsky | G06F 8/60 717/177 |
| 2011/0265164 | A1* | 10/2011 | Lucovsky | G06F 9/45533 718/1 |
| 2012/0030672 | A1* | 2/2012 | Zygmuntowicz | G06F 9/45558 718/1 |
| 2013/0046870 | A1* | 2/2013 | Saldhana | G06F 9/468 709/223 |
| 2013/0086141 | A1* | 4/2013 | Saldhana | H04L 63/0815 709/203 |
| 2013/0232480 | A1* | 9/2013 | Winterfeldt | G06F 9/5072 717/177 |
| 2015/0378700 | A1* | 12/2015 | Rachamadugu | G06F 8/71 717/120 |
| 2016/0124742 | A1* | 5/2016 | Rangasamy | G06F 8/30 717/103 |
| 2016/0269425 | A1* | 9/2016 | Shieh | H04L 63/0254 |
| 2017/0235649 | A1* | 8/2017 | Shah | G06F 11/1464 707/649 |
| 2018/0074815 | A1* | 3/2018 | Alabes | G06F 9/44526 |
| 2018/0088935 | A1* | 3/2018 | Church | G06F 11/3051 |
| 2018/0136931 | A1* | 5/2018 | Hendrich | G06F 11/30 |
| 2018/0145884 | A1* | 5/2018 | Stefanov | H04L 67/10 |
| 2018/0167275 | A1* | 6/2018 | Kovacheva | H04L 41/40 |
| 2018/0198845 | A1* | 7/2018 | Kulp | G06F 9/54 |
| 2018/0321918 | A1* | 11/2018 | McClory | H04L 41/5041 |
| 2019/0004871 | A1* | 1/2019 | Sukhomlinov | G06F 9/541 |
| 2019/0320012 | A1* | 10/2019 | Walsh | H04L 41/5054 |
| 2020/0019388 | A1* | 1/2020 | Jaeger | G06F 8/4441 |
| 2020/0042315 | A1* | 2/2020 | Gupta | G06F 8/36 |
| 2020/0042365 | A1* | 2/2020 | Tanna | G06F 9/465 |
| 2020/0112604 | A1* | 4/2020 | Kulp | H04L 67/141 |
| 2020/0218634 | A1* | 7/2020 | Jones | G06F 8/43 |
| 2020/0278920 | A1* | 9/2020 | Khakare | G06F 9/547 |
| 2020/0364060 | A1* | 11/2020 | Duke | G06F 9/5072 |
| 2021/0011688 | A1* | 1/2021 | Sasidharan | G06F 8/10 |
| 2021/0019205 | A1* | 1/2021 | Moukaddem | G06F 8/65 |
| 2021/0055917 | A1* | 2/2021 | Khakare | G06F 3/0482 |
| 2021/0058455 | A1* | 2/2021 | Kozhaya | H04L 47/805 |
| 2021/0064347 | A1* | 3/2021 | Junior | G06F 8/30 |
| 2021/0124576 | A1* | 4/2021 | Gungabeesoon | G06F 8/38 |
| 2021/0132935 | A1* | 5/2021 | Dinh | G06F 9/4411 |

OTHER PUBLICATIONS

Ren, Zhongshan, et al. "Migrating web applications from monolithic structure to microservices architecture." Proceedings of the tenth asia-pacific symposium on internetware. 2018. (Year: 2018).*
Singh, Vindeep, and Sateesh K. Peddoju. "Container-based microservice architecture for cloud applications." 2017 International Conference on Computing, Communication and Automation (ICCCA). IEEE, 2017. (Year: 2017).*
Consol Software GMBH, "Citrus Integration Testing," https://citrusframework.org, 2019, 6 pages.
J.D. Burnham, "A Simple Definition: What is an 'Endpoint'?" https://www.druva.com/blog/simple-definition-endpoint/, Feb. 13, 2015, 3 pages.
Sharpened Productions, ".CONFIG File Extension," https://fileinfo.com/extension/config, 2019, 2 pages.
Apache, "2.2 Velocity Template Languag (VTL): An Introduction," people.apache.org/~henning/velocity/html/ch02s02.html, 2019, 2 pages.
Wikipedia, "Apache Velocity," https://en.wikipedia.org/wiki/Apache_Velocity, Sep. 12, 2019, 3 pages.
Wikipedia, "Configuration File," https://en.wikipedia.org/wiki/Configuration_file, Sep. 10, 2019, 3 pages.
Wikipedia, "Deployment Descriptor," https://en.wikipedia.org/wiki/Deployment_descriptor, Jul. 23, 2019, 2 pages.
Wikipedia, "GitLab," https://en.wikipedia.org/wiki/GitLab, Sep. 11, 2019, 6 pages.
Realtime API Hub, "Event-Driven APIs," https://realtimeapi.io/hub/event-driven-apis/, 2019, 3 pages.
Wikipedia, "DevOps," https://en.wikipedia.org/wiki/DevOps, Sep. 9, 2019, 10 pages.
Amazon Web Services, "How AWS Auto Scaling Works," https://docs.aws.amazon.com/autoscaling/plans/userguide/how-it-works.html, 2019, 3 pages.
Wikipedia, "Java Logging Framework," https://en.wikipedia.org/wiki/Java_logging_framework, Nov. 2, 2018, 4 pages.
Tutorials Point, "JUnit—Test Framework," https://www.tutorialspoint.com/junit/junit_test_framework.htm, 2019, 3 pages.
Wikipedia, "Legacy Code," https://en.wikipedia.org/wiki/Legacy_code, Aug. 22, 2019, 2 pages.
Wikipedia, "Microservices," https://en.wikipedia.org/wiki/Microservices, Aug. 31, 2019, 10 pages.
Nginx Inc., "The Twelve Factors Applied to Microservices," https://www.nginx.com/blog/microservices-reference-architecture-nginx-twelve-factor-app/, 2019, 7 pages.
Wikipedia, "Service Granularity Principle," https://en.wikipedia.org/wiki/Service_granularity_principle, Aug. 29, 2019, 3 pages.
L. Cutolo,"Service Granularity," https://it.toolbox.com/blogs/lucacutolo/service-granularity-071310, Jul. 13, 2010, 5 pages.
Wikipedia, "Twelve-Factor App Methodology," https://en.wikipedia.org/wiki/Twelve-Factor_App_methodology, Sep. 3, 2019, 2 pages.
Educba, "Weblogic vs Tomcat," https://www.educba.com/weblogic-vs-tomcat/, 2019, 15 pages.
Quora, "What Is the Function of Apache Tomcat, and How Do I Use It?" https://www.quora.com/What-is-the-function-of-Apache-Tomcat-and-how-do-I-use-it, 2019, 4 pages.
Techopedia, "Legacy Code," https://www.techopedia.com/definition/25326/legacy-code, 2019, 3 pages.
Smart Bear, "API Endpoints—What Are They? Why Do They Matter?" https://smartbear.com/learn/performance-monitoring/api-endpoints/, 2019, 4 pages.

* cited by examiner

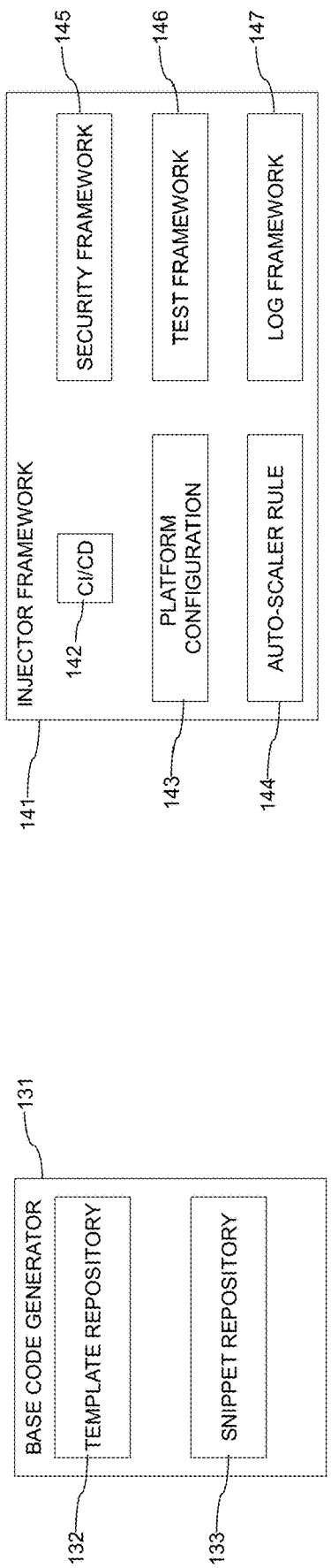
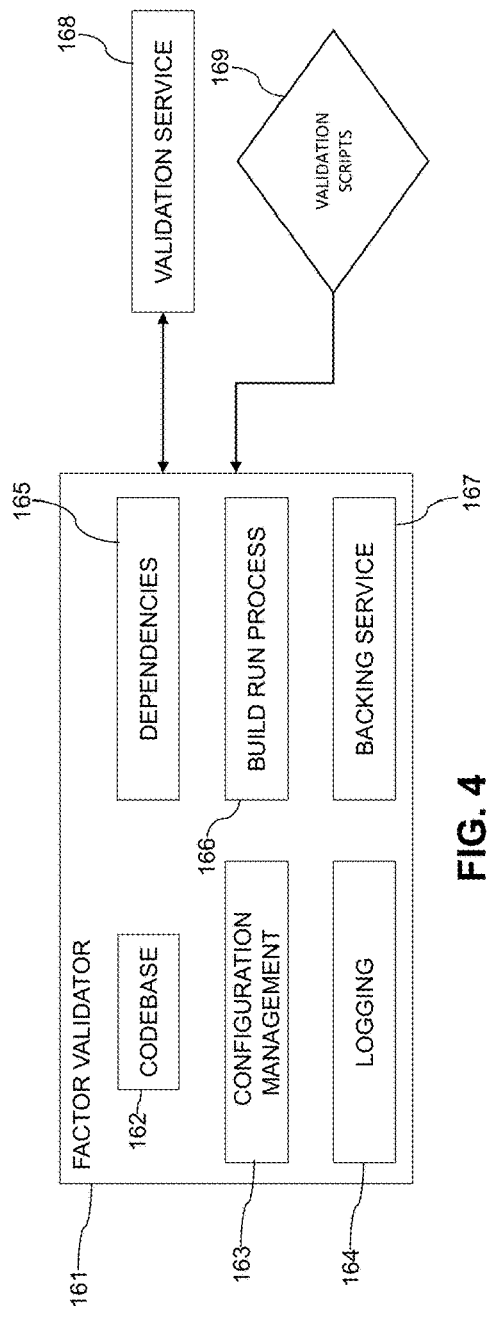
FIG. 2
FIG. 3
FIG. 4

```
{
    "metadata": {
        "proxyCount": 1,
        "serviceName": "ssndashboard",
        "businessSegment": ".",
        "serviceType": "REST TO SOAP",
        "author": "Nitin"
    },
    "application_details": [
        {
            "soapservice": {
                "url": "http://agiledt.us.dell.com/Agile/extension/EbiwxService/wsdl",
                "name": "EbiwxService",
                "username": "agile web service",
                "password": "onetrail",
                "namespace": "http://b1.dellprint.pln.agile.pln.dell.com",
                "authenticationRequired":
            }
        }
    ],
    "accelerators_details": {
        "inventoryAppName": "ssndashboard-service",
        "springAdminDashboard": {
            "adminUrl": "http://agiledt.us.dell.com/Agile/extension/EbiwxService/wsdl",
        },
        "pcfHostNameContext": "auvdev2.prf.dell.com",
        "isSpringAdminEnabled": true
    }
}
```

```
Dockerfile
1  FROM node:10
2
3  # Create app directory
4  WORKDIR /usr/src/app
5
6  # Install app dependencies
7  # A wildcard is used to ensure both package.json
8  # where available (npm@5+)
9  COPY package*.json ./
10
11 RUN npm install
12 # If you are building your code for production
13 # RUN npm ci --only=production
14
15 # Bundle app source
16 COPY . .
17
18 EXPOSE 8080
19 CMD [ "npm", "start" ]
```

CODE DEVELOPMENT FOR DEPLOYMENT ON A CLOUD PLATFORM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to code processing in order to deploy the code on a cloud platform.

BACKGROUND

Software application developers seek techniques which result in more efficient development and deployment of applications. For example, in order to increase development and operational speed, and reduce processing overhead, developers are using DevOps to develop applications and are designing applications to execute on microservices-based cloud platforms.

In general, DevOps corresponds to the combination of software development ("Dev") and information technology operations ("Ops"), which reduces the time to develop applications that have features, fixes, and updates closely aligned with the objectives of an enterprise. A microservices architecture structures applications as collections of loosely coupled services. The microservices utilize lightweight protocols and are fine-grained. An application which is comprised of multiple smaller services is easier to understand, develop, scale and test. For example, development can be performed by teams working independently and in parallel with each other to generate the different microservices. Services in a microservices architecture are able to be independently deployed by multiple providers communicating over a network in a cloud platform, which increases operational efficiency and reduces computing resource overhead.

Given recent trends to design and develop applications for cloud-based microservices architectures, there is a need for techniques and systems which can efficiently modify existing code and/or generate new code so that the code is capable of being deployed on a microservices-based cloud platform.

SUMMARY

Illustrative embodiments of the present disclosure provide techniques for generating code for deployment in a microservices-based cloud environment. Embodiments advantageously convert existing codebases, which are not cloud ready, to microservice codebases deployable on cloud platforms.

In one embodiment, a method comprises receiving code for computer programming, analyzing the code and extracting a plurality of configuration properties from the code. In the method, one or more configuration files are generated from the extracted plurality of configuration properties, and microservice code is generated from the one or more configuration files. The microservice code is configured for deployment on one or more cloud computing platforms.

These and other illustrative embodiments include, without limitation, methods, apparatus, networks, systems and processor-readable storage media.

BRIEF DESCRIPTION OF THE DRAWINGS

FIG. 2 is a block diagram of an exemplary base code generator of the microservices development platform in an illustrative embodiment.

FIG. 3 is a block diagram of an exemplary injector framework of the microservices development platform in an illustrative embodiment.

FIG. 4 is a block diagram of an exemplary factor validator of the microservices development platform in an illustrative embodiment.

FIG. 7 depicts example pseudocode for providing JavaScript Object Notation (JSON) properties to a microservice code generator in an illustrative embodiment.

FIG. 8 depicts example pseudocode for generating a microservice post application programming interface (API) call in an illustrative embodiment.

FIG. 9 depicts example pseudocode for generating a microservice Docker enabled service in an illustrative embodiment.

FIG. 10 depicts example pseudocode for generating a commit into a software development tool in an illustrative embodiment.

DETAILED DESCRIPTION

Figure 1:
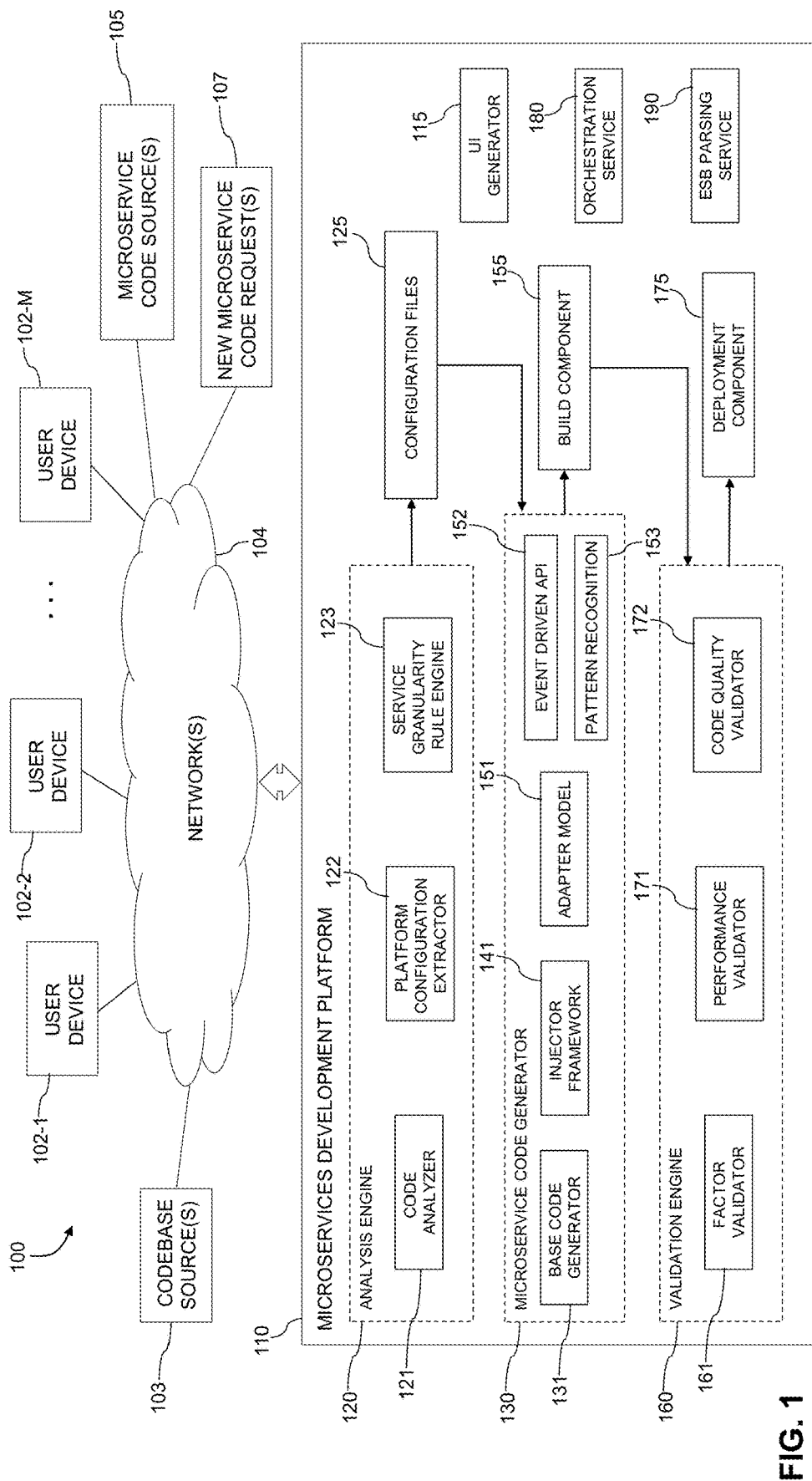
FIG. 1 is a block diagram of an information processing system comprising a microservices development platform configured for generating code for deployment in a microservices-based cloud environment in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "codebase" refers to computer programming code, such as source code used in connection with building, for example, a software system, application or software component. A codebase can include, but is not necessarily limited to, human-written source code files, configuration files and property files. Codebase may be stored in various source code repositories and manipulated by various code editors. Codebase includes, for example, source code for maintaining application functionality.

As used herein, "microservice" or "microservices" refer to a collection of loosely coupled services which execute different features of an application. Applications in a microservice-based software architecture are composed of multiple different fine-grained services with lightweight protocols that facilitate understanding, development and testing and improve resiliency.

Microservices corresponding to different features of an application may be independently developed, deployed and scaled.

FIG. 1 shows an information processing system 100 configured in accordance with an illustrative embodiment. The information processing system 100 comprises user devices 102-1, 102-2, . . . 102-M (collectively "user devices 102"). The user devices 102 communicate over a network 104 with a microservices development platform 110.

The user devices 102 can comprise, for example, Internet of Things (IoT) devices, desktop, laptop or tablet computers, mobile telephones, or other types of processing devices capable of communicating with the microservices development platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K and L are assumed to be arbitrary positive integers greater than or equal to two.

The term "client" or "user" herein is intended to be broadly construed so as to encompass numerous arrangements of human, hardware, software or firmware entities, as well as combinations of such entities. Microservices development services may be provided for users utilizing one or more machine learning models, although it is to be appreciated that other types of infrastructure arrangements could be used. At least a portion of the available services and functionalities provided by the microservices development platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the microservices development platform 110, as well as to support communication between the microservices development platform 110 and connected devices (e.g., user devices 102) and/or other related systems and devices not explicitly shown.

In some embodiments, the user devices 102 are assumed to be associated with repair technicians, system administrators, information technology (IT) managers, software developers or other authorized personnel configured to access and utilize the microservices development platform 110.

The microservices development platform 110 in the present embodiment is assumed to be accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The microservices development platform 110, on behalf of respective infrastructure tenants each corresponding to one or more users associated with respective ones of the user devices 102, provides for conversion of legacy code, or any codebase which is not cloud ready, to microservice code for deployment on a cloud computing platform. According to embodiments, the microservices development platform 110 is an intelligent platform for converting existing code which is not cloud ready to be compatible for deployment on cloud platforms. In addition, the microservices development platform 110 is also configured for adding microservice code enhancements to existing microservice code, and for developing new microservice code.

Referring to FIG. 1, one or more codebase sources 103 include, for example, codebase repositories storing existing code that is not cloud ready, such as, for example, legacy code. One or more microservice code sources 105 store existing microservice code which can be enhanced by the microservices development platform 110. Such enhancements may include, for example, processing to determine whether existing microcode services are 12 Factor compliant and/or to make existing microcode services 12 Factor compliant, adding reusable microservice components, for example, from an injector framework 141 discussed in more detail herein and adding connections to external systems. The codebase sources 103 and the microservice code sources 105 may be, for example, part of local storage on a user device 102 or associated with a storage system attached to and accessible via the network 104.

The codebase and microservice code sources 103 and 105 in some embodiments are implemented using one or more storage systems or devices associated with the microservices development platform 110. In some embodiments, one or more of the storage systems utilized to implement the codebase and microservice code sources 103 and 105 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Figure 5:
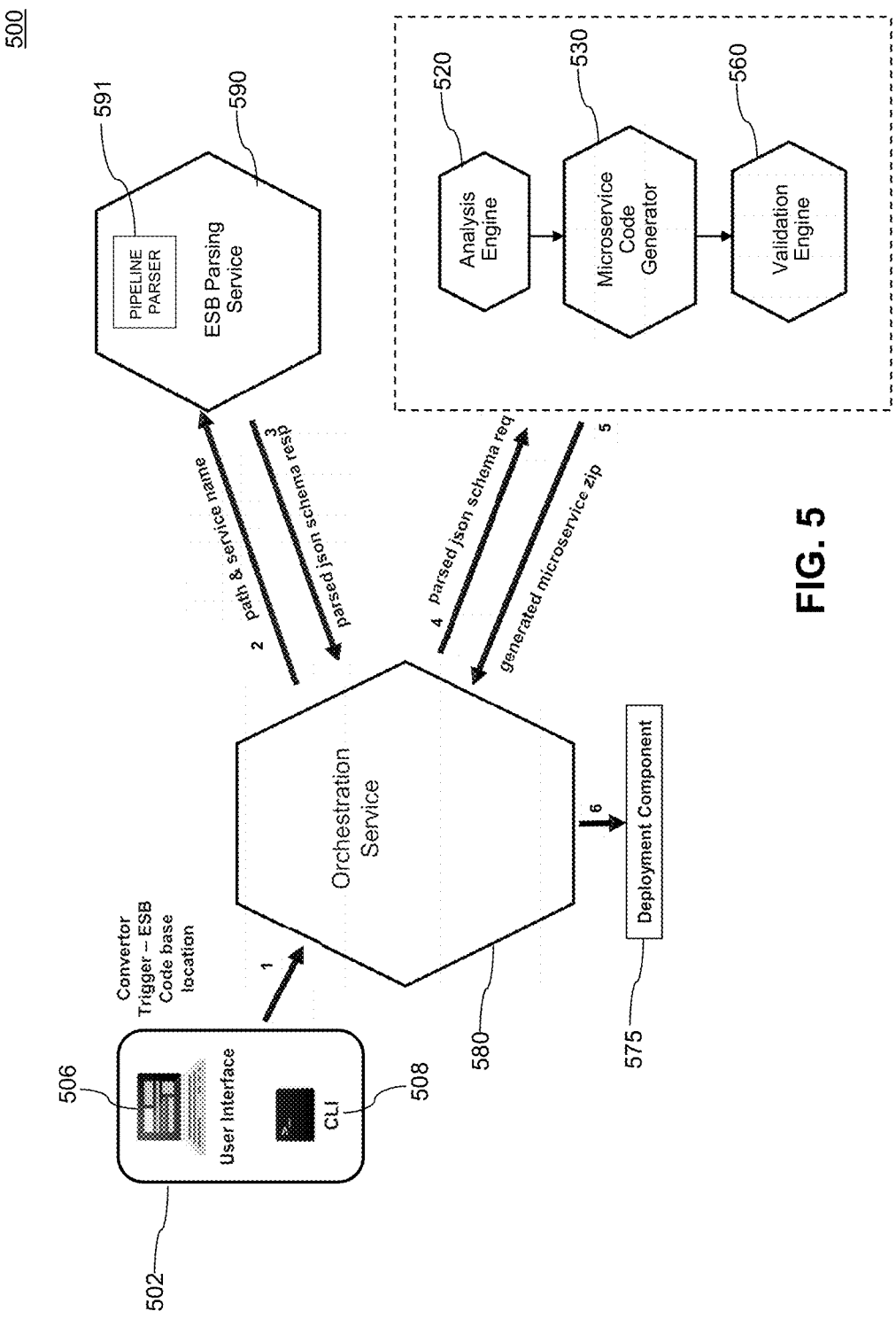
FIG. 5 is a block diagram illustrating the orchestration of operations for initiating generation of, generating and deploying microservice code using the microservices development platform in an illustrative embodiment.

As described further herein in connection with FIG. 5, a user via a user interface (e.g. user interface 506 or command line interface (CLI) 508) on a user device (e.g., 102/502) can specify or click on a codebase location from a codebase source 103, so that a codebase from the specified location can be retrieved and converted to microservice code for deployment on a cloud platform. Similarly, a user via a user interface (e.g. user interface 506 or CLI 508) on a user device (e.g., 102/502) can specify or click on a location of microservice code from a source 105, so that the microservice code from the specified location can be retrieved and processed to be enhanced by the microservices development platform 110.

As illustrated in FIG. 1, new microservice code requests 107 can be received at the microservice development platform 110 via the network 104. The requests 107 may be entered and processed, for example, through a user interface (e.g. user interface 506 or CLI 508) on a user device 102/502, or from a different device connected to the network 104.

As described further herein, a pattern recognition engine 153 is used in connection with generating the microservices based on enterprise integration patterns, such as, for example, collection, distribution, peer-to-peer (p2p) and batch.

The microservices development platform 110 includes an analysis engine 120, a microservice code generator 130 and a validation engine 160. According to the embodiments, the analysis engine 120 receives as input existing code that is not cloud ready, such as, for example, legacy code, which is to be converted into microservice code. The existing code to be converted may originate from multiple vendors and can be in multiple formats. The microservices development platform 110 is configured to generate cloud native microservices from various types of input code written in a variety of programming languages and based on any number of developer platforms, such as, but not necessarily limited to, JAVA, JAVA Servlets, Business Process Execution Language (BPEL), and enterprise service bus (ESB). The analysis engine 120 includes a code analyzer 121, a platform configuration extractor 122 and a service granularity rule engine 123.

According to the embodiments, the code analyzer 121 is configured to analyze the structure of the input code in connection with features such as, but not necessarily limited to, enterprise logic, endpoints, data sources, messaging queues, web services and templates in the code. For example, endpoints can be devices or nodes receiving and sending communications over a network. In connection with APIs, an endpoint may include a URL of a server or service, or other locations from which APIs can access resources for performing their functions. Endpoints can be outside a firewall of an enterprise.

Templates may refer to, for example, templates corresponding to template languages used for referencing objects defined in JAVA code and for incorporating dynamic content in web pages. Such template languages may be based on Apache™ Velocity, which is a JAVA-based template engine.

The platform configuration extractor 122 extracts configuration properties from the input code. For example, the platform configuration extractor 122 is configured to extract configuration properties related to web server and servlet containers for implementing servlet and server page specifications, and providing an HTTP web server environment in which code can be executed. The web server and servlet container processes can run virtual machines (VMs) and can be configured by editing XML configuration files. The platform configuration extractor 122 is also configured to extract configuration properties related to handling system and configuration level functionalities, application level logic and/or enterprise logic in connection with the development and deployment of applications into a web container (e.g., application server or web server).

The service granularity rule engine 123 determines a granularity of one or more services in the input code. For example, if there is a need for one or more services to be broken down to one or more microservices, the service granularity rule engine 123 determines the requirements for the size of a service, such as whether the services are coarse-grained or fine-grained. Fine-grained services may correspond to, for example, log checking, infrastructure services and/or task to support processes. Coarse-grained services may correspond to entire processes or complex enterprise logic (e.g. purchasing, procurement). In one or more embodiments, service granularity rule engine 123 determines operation dependencies and functionality grouping.

The analysis engine 120 generates one or more configuration files 125 based on the outputs from the code analyzer 121, the platform configuration extractor 122 and the service granularity rule engine 123. The configuration files 125 (e.g., "CONFIG" files) include parameters that define settings or preferences for building or executing computer programs, applications, server processes and operating systems. For example, the configuration files 125 include, but are not necessarily limited to user interface, JSON, XML, property and/or YAML ("YAML Ain't Markup Language") configuration files.

The configuration files 125 are provided to the microservice code generator 130 which reads and analyzes the configuration files 125, and uses the configuration files 125 to generate microservice code. The microservice code generator 130 includes a base code generator 131, an injector framework engine 141, an adapter model engine 151, an event driven API 152 and a pattern recognition engine 153. As can be seen in FIG. 2, the base code generator 131 includes a template repository 132 and a code snippet (e.g., fragment) repository 133. In generating the microservice code, microservice code generator 130 utilizes one or more code templates from the template repository 132, and one or more code snippets from the code snippet repository 133. The template repository 132 includes, for example, code templates for REST (Representational State Transfer) and SOAP (Simple Object Access Protocol) APIs, as well as code templates for messaging, databases and files. Templates from the template repository 132 may be used as is, or modified during the code development process to change values in the templates.

The code snippet repository 133 includes code snippets which can be part of the generated microservice code. Code snippets from the code snippet repository 133 may include, for example, code related to alert/notification generation, assignments, transformations, error handling, and replacements. The assignments assign values to variables, the transformations modify the structure of a payload using, for example, XQuery, XSLT, etc., and the replacements are combinations of transformations and assignments. The code snippets may include vacancies for the microservice generator 130 and/or developers to insert functionality specific to an enterprise.

The injector framework engine 141 includes a plurality of reusable microservice components, which can be added to the microservice code. For example, the generated microservice code can include one or more placeholders for one or more microservice accelerators providing different types of microservices. Referring to FIG. 3, the microservice accelerators include, for example, a continuous integration (CI)/continuous delivery (CD) accelerator 142, a platform configuration accelerator 143, an auto-scaler rule accelerator 144, a security framework accelerator 145, a testing framework accelerator 146 and a logging framework accelerator 147.

The CI/CD accelerator 142 implements functionality for multi-environment support, such as, for example, blue-green deployment to run two identical production environments (i.e., Blue and Green). Blue-green deployment reduces downtime and risk by having one of the environments live and serving all production traffic, while the other environment is idle. The CI/CD accelerator 142 automates building and deployment processes. The platform configuration accelerator 143 implements functionality for use of deployment descriptors, which describe how, for example, components, modules and/or applications (e.g., web applications, enterprise applications) are to be deployed. The platform configuration accelerator 143 also externalizes properties and provides for automatic refreshing. For example, a platform configuration accelerator 143 may perform runtime property refreshing so that there is little or no downtime for configuration property changes.

The auto-scaler rule accelerator 144 implements functionality for scaling, such as dynamic and/or predictive scaling of system resources to maintain high availability. Dynamic scaling creates scaling policies for resources, which adjust resource capacity in response to real-time changes in resource utilization. Predictive scaling relies on machine learning to analyze the historical workload of resources and forecasts load to generate scheduled scaling actions to ensure availability of resource capacity. Scaling can be based on metrics such as, for example, HTTP throughput, latency and memory. The security framework accelerator 145 implements functionality for different security protocols which provide, for example, access control on the Internet, and for cloud services and mobile applications, firewall configurations, and device and/or user authentication. Such security protocols include, for example, Layer 7,OAuth, DIAS, and Kerberos.

The test framework accelerator 146 implements functionality for testing during code development and/or building. For example, a test framework can simulate client requests and/or server responses during a software build process, and/or provide automated API testing. A test framework can include, for example, a regression testing framework which implements unit testing in JAVA. The log framework accelerator 147 implements functionality for activity monitoring and recording. The log framework accelerator provides logging framework packages for different platforms.

Additional microservice accelerators provide, for example, a single point of dependency management to abstract components and microservices dependency versions in one shell, error/exception handling strategies based on microservice generator patterns, standardization of error response structures for web services, control over latency and failure between distributed systems, monitoring and configuring application development frameworks at runtime, validating the health of third-party connections used in an application, validating config server properties in a user interface dashboard, error analytics and throughput monitoring.

The microservice code generator 130 further includes the adapter model engine 151 to generate microservice code with provisions for one or more connections to external systems, such as, for example, one or more backend services. The backend services can include, for example, database management systems, such as database servers for storing and retrieving data as requested by applications, task automation systems, third-party customer relationship management (CRM) applications providing enterprises with an interface for case and task management and identifying priority customers, and cloud environments for enterprise solutions including, for example, information management, compliance, human resources functionality and management, and business-to-business (B2B) integration. According to one or more embodiments, the generated microservice code can include values for implementing one or more connections to the external systems written into the code.

The microservice code generator 130 further includes the event driven API 152 to trigger actions in response to changes in states ("events"). In an event-driven architecture, interactions between multiple services and products are driven by event emitters, event consumers, and event channels, whereby the event drive API 152 initiates actions in response to delivery of an event.

The microservice code generator 130 further includes the pattern recognition engine 153 to use machine learning and artificial intelligence techniques to identify enterprise integration patterns, such as, for example, collection, distribution, peer-to-peer (p2p) and batch. The identified patterns are used by the microservice code generator 130 to generate microservice code that is compatible with the integration patterns of an enterprise. The pattern recognition engine 153 is configured to compile information and feedback regarding enterprise integration patterns, and the success of solutions that have been implemented based on identified enterprise integration patterns. Based on this information and feedback, the pattern recognition engine 153 uses machine learning techniques to learn what patterns correspond different enterprises. According to illustrative embodiments, the pattern recognition engine 153 uses machine learning models (e.g., linear regression, neural network, Support Vector Machine (SVM), Multilayer Perceptron (MLP), a deep learning model, decision trees and/or clustering) based on training data sets collected by a feedback and training component.

The microservice code generator 130 outputs generated microservice code to a build component 155, which manages building of the code into a form that can be run on a cloud platform. The build component 155 may coordinate and control other components used in connection with generating, testing and deploying the resulting software. According to one or more embodiments, the build component 155 compiles and packages the generated code from the microservice code generator 130 into particular groups or orders needed for execution.

The packaged microservice code is provided from the build component 155 to the validation engine 160, which validates the microservice code prior to the deployment of the code on one or more cloud computing platforms. The validation engine 160 includes a factor validator 161, a performance validator 171 and a code quality validator 172. The factor validator 161 validates the code in connection with a plurality of factors, including, but not necessarily limited to: (i) a number of codebases for a plurality of microservices; (ii) whether dependencies have been declared; (iii) a storage location of one or more configurations; (iv) whether one or more backing services are treated as attached resources; (v) whether build and run stages are separated; and (vi) whether logs are produced as event streams. Referring to FIG. 4, the factor validator 161 includes a codebase component 162 for determining the number of codebases for a plurality of microservices, and whether there is one codebase for each deployed service, wherein the codebase is used for multiple deployments, a configuration management component 163 for determining a storage location of one or more configurations that vary between deployments, a logging component 164 for determining whether logs are produced as event streams and leave the execution environment to aggregate, a dependencies component 165 for determining whether dependencies have been declared with no implicit reliance on system tools or libraries, a build run process component 166 for determining whether build and run stages are separated, and a backing service component 167 for determining whether one or more backing services are treated as attached resources and attached and detached by the execution environment.

Additional validation factors which can be analyzed by the factor validator 161 include, but are not necessarily limited to, whether applications are deployed as one or more stateless processes with persisted data stored on a backing service, whether self-contained services are available to other services by specified ports, whether concurrency is taken into account by scaling individual processes, whether fast startup and shutdown are taken into account, whether environments are as similar as possible, and whether any required administrative tasks are maintained in source control and packaged with applications. According to one or more embodiments, the validation factors correspond to the 12 Factor App methodology. However, the embodiments are not necessarily limited thereto. According to one or more embodiments, a validation service 168 can be used to determine whether the microservice code is 12 Factor compliant so that cloud native features can be enabled. The validation scripts 169 comprise a set of scripts (e.g., Linux scripts) to perform the 12 Factor validation. Results of the validation may indicate whether the microservice code passes or fails in connection with each validation factor.

Each of the code inputs and/or requests 103, 105 and 107 can be processed by microservices development platform 110 and the validation engine 160 to determine whether microservice code is 12 Factor compliant and/or to make microservice code 12 Factor compliant.

The performance validator 171 evaluates the performance of the code under different load conditions, such as, for example, real-time load conditions and/or expected normal and peak load conditions of a system. Load testing may provide data on, for example, response time and/or the number of MIPS (millions of instructions per second) when executing the code under different load constraints.

The code quality validator 172 analyzes a quality of the microservice code. For example, the code quality validator 172 executes microservice code files or sets of microservice code files, converts the code files into a model that is optimized for security vulnerability analysis, and analyzes the model for code vulnerabilities. The code quality validator 172 can perform static or dynamic analysis of code to detect for example, bugs, code smells, duplicate code and security vulnerabilities, and provide developers with reports on the analysis.

Once the microservice code has been validated by the validation engine 160, the code is provided to a deployment component 175 which configures the code for deployment and/or deploys the code on one or more cloud computing platforms, for example, as part of FaaS, CaaS and/or PaaS offerings. The validation engine 160 and the deployment component 175 can be parts of a CD/CI pipeline where a final version of the code is reviewed, staged and produced. For example, following automated testing and review of the code by the validation engine 160, the deployment component 175 deploys the code to staging and production environments for eventual release of the microservices software.

FIG. 5 is a block diagram 500 illustrating the orchestration of operations for initiating generation of, generating and deploying microservice code using the microservices development platform 110. Referring to FIG. 5, a user via a user interface 506 or CLI 508 on a user device 502 specifies or clicks on a codebase location from a codebase source, so that a codebase from the specified location can be retrieved and converted to microservice code for deployment on a cloud platform. Similarly, a user via a user interface 506 or CLI 508 can specify or click on a location of microservice code from a source, so that the microservice code from the specified location can be retrieved and processed to be enhanced by the microservices development platform 110. Referring to FIG. 1, the user interface 506 or CLI 508 may be configured and generated by a user interface generator 115, which can be part of the microservices development platform 110.

The specification or selection of the codebase location triggers an orchestration service 580 (arrow 1), which sends a version control system (e.g., "Git") path and ESB service name (arrow 2) to an ESB parsing service 590. As used herein, a "Git" refers to a distributed version control system to manage code history. As used herein, "GitHub" refers to a Git repository hosting service providing revision control and code management functionality. For example, a GitHub provides access control and collaboration features such as, for example, wikis, task management, bug tracking and feature requests for code development projects. As can be seen in FIG. 1, orchestration and ESB parsing services 180 and 190 can be components of the microservices development platform 110.

The ESB parsing service 590, which includes a pipeline parser 591 responds to the orchestration service 580 with a parsed JSON Schema response (arrow 3). More specifically, the orchestration service 580 obtains the codebase from source version control (e.g., Team Foundation Server (TFS) and Git) and routes the codebase as input to the ESB parsing service 590. The ESB parsing service 590 decodes the ESB codebase and finds a pipeline module from the ESB codebase. The pipeline parser 591 analyzes and generates a configuration file which includes logic to generate microservice code.

Based on the parsed JSON Schema response, the orchestration service 580 then sends a parsed JSON Schema request (arrow 4) to one or more of the analysis engine 520, microservice code generator 530 and validation engine 560 of a microservices development platform so that the input code can be analyzed and microservice code can be generated and validated as discussed herein. The validated and generated microservice code, for example, in the form of zip file, is then provided to the orchestration service 580 (arrow 5), which then sends the generated microservice code to a deployment component 575 (arrow 6) to configure the microservice code for deployment. The deployment components 175/575 can comprise, for example, web-based DevOps lifecycle tools that provide a repository manager with CI/CD pipeline features. An example of such a DevOps lifecycle tool is GitLab. The orchestration service 580 provides a centralized controller to orchestrate each of the steps from retrieving input code which is not cloud ready (e.g., legacy code) to deployment of the microservice code on a cloud platform.

Figure 6:
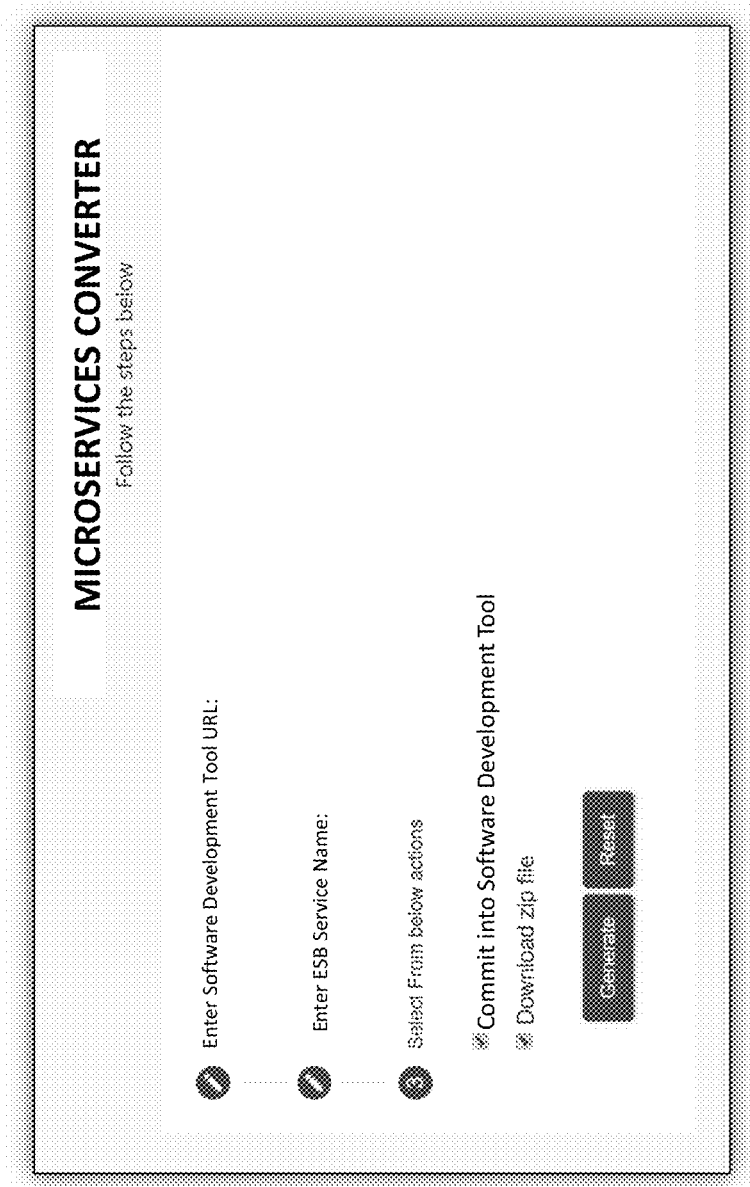
FIG. 6 is screenshot of a user interface for selecting code for conversion to microservice code using the microservices development platform in an illustrative embodiment.

FIG. 6 illustrates an example screenshot 600 of a user interface for selecting code for conversion to microservice code using a microservices development platform. As can be seen, the interface includes fields to enter a software development tool URL, and ESB service name, and permits a user to select options for committing into a software development tool (e.g., DevOps tool) and/or downloading the validated and generated microservice code as a zip file.

FIG. 7 depicts example pseudocode 700 for providing JSON properties to a microservice code generator 130/530 in an illustrative embodiment. The pseudocode 700 comprises code snippets to illustrate the configuration files 125 in FIG. 1.

Figure 8:
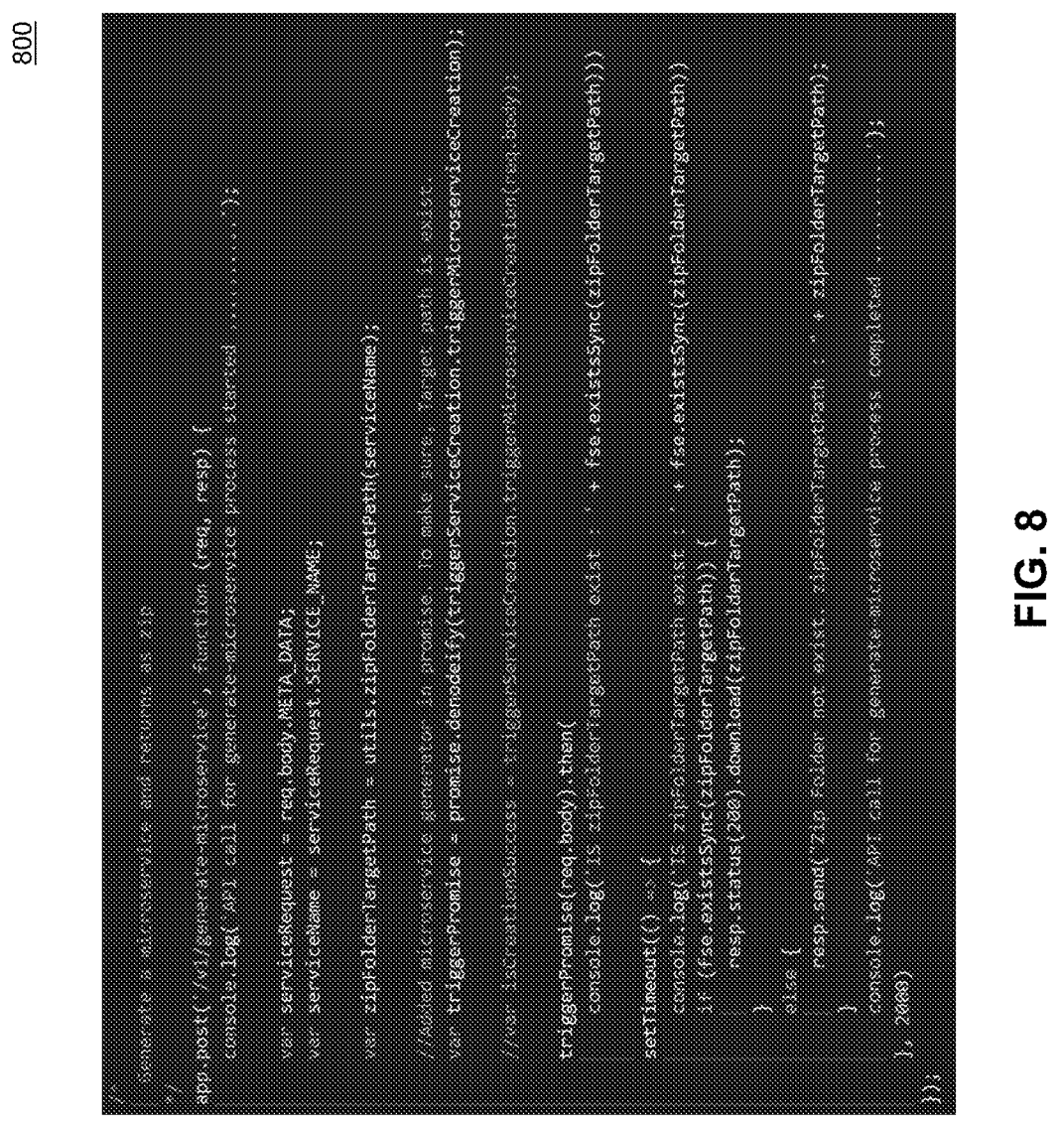
Figure 10:
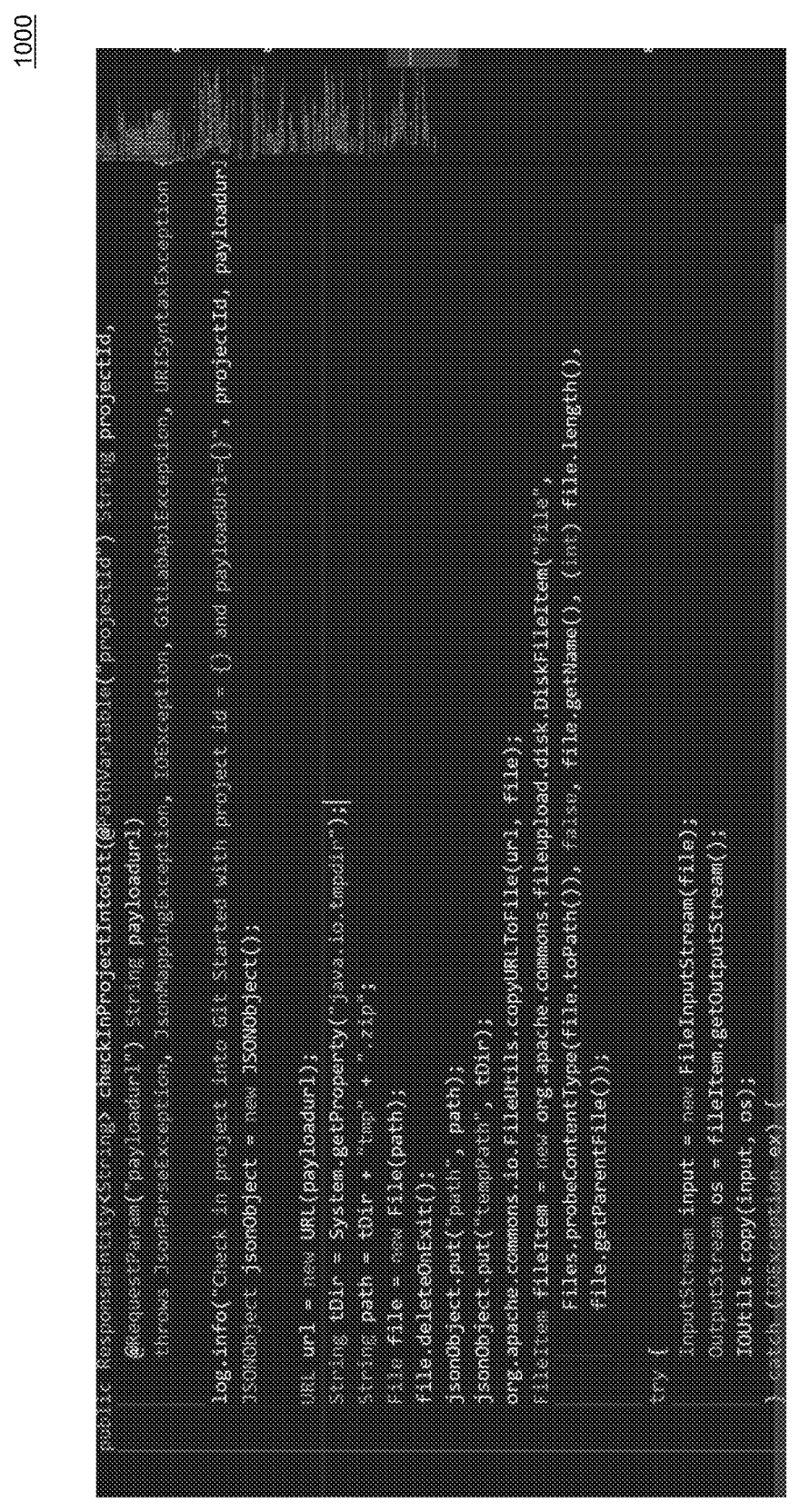

FIG. 8 depicts example pseudocode 800 for generating a microservice post API call in an illustrative embodiment. FIG. 9 depicts example pseudocode 900 for generating a microservice Docker enabled service in an illustrative embodiment. The pseudocode 800 and 900 include code snippets generated by the base code generator 131. FIG. 10 depicts example pseudocode 1000 for generating a commit into a software development tool in an illustrative embodiment. The pseudocode 1000 includes code snippets for adding microservice components via the injector framework engine 141.

According to the embodiments, the platform 110 is universal with respect to different cloud platform vendors, and is configured to generate vendor independent microservice code for deployment on multiple cloud platforms.

Although shown as elements of the microservices development platform 110, the analysis engine 120, the microservices code generator 130 and/or the validation engine 160 in other embodiments can be implemented at least in part externally to the microservices development platform 110, for example, as stand-alone servers, sets of servers or other types of system coupled to the network 104. For example, the analysis engine 120, the microservices code generator 130 and/or the validation engine 160 may be provided as cloud services accessible by the microservices development platform 110.

The analysis engine 120, the microservices code generator 130 and/or the validation engine 160 in the FIG. 1 embodiment are each assumed to be implemented using at least one processing device. Each such processing device generally comprises at least one processor and an associated memory, and implements one or more functional modules for controlling certain features of the analysis engine 120, the microservices code generator 130 and/or the validation engine 160.

At least portions of the microservices development platform 110 and the components thereof may be implemented at least in part in the form of software that is stored in memory and executed by a processor. The microservices development platform 110 and the components thereof comprise further hardware and software required for running the microservices development platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the analysis engine 120, the microservices code generator 130, the validation engine 160 and other components of the microservices development platform 110 in the present embodiment are shown as part of the microservices development platform 110, at least a portion of the analysis engine 120, the microservices code generator 130, the validation engine 160 and other components of the microservices development platform 110 in other embodiments may be implemented on one or more other processing platforms that are accessible to the microservices development platform 110 over one or more networks. Such components can each be implemented at least in part within another system element or at least in part utilizing one or more stand-alone components coupled to the network 104.

It is assumed that the microservices development platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the analysis engine 120, the microservices code generator 130, the validation engine 160 and other components of the microservices development platform 110, and the elements thereof can each be implemented in the form of one or more LXCs running on one or more VMs. Other arrangements of one or more processing devices of a processing platform can be used to implement the analysis engine 120, the microservices code generator 130 and the validation engine 160, as well as other components of the microservices development platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the microservices development platform 110 to reside in different data centers. Numerous other distributed implementations of the microservices development platform 110 are possible.

Accordingly, one or each of the analysis engine 120, the microservices code generator 130, the validation engine 160 and other components of the microservices development platform 110 can each be implemented in a distributed manner so as to comprise a plurality of distributed components implemented on respective ones of a plurality of compute nodes of the microservices development platform 110.

It is to be appreciated that these and other features of illustrative embodiments are presented by way of example only, and should not be construed as limiting in any way.

Accordingly, different numbers, types and arrangements of system components such as the analysis engine 120, the microservices code generator 130, the validation engine 160 and other components of the microservices development platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the microservices development platform can be offered to cloud infrastructure customers or other users as part of FaaS, CaaS and/or PaaS offerings.

Figure 11:
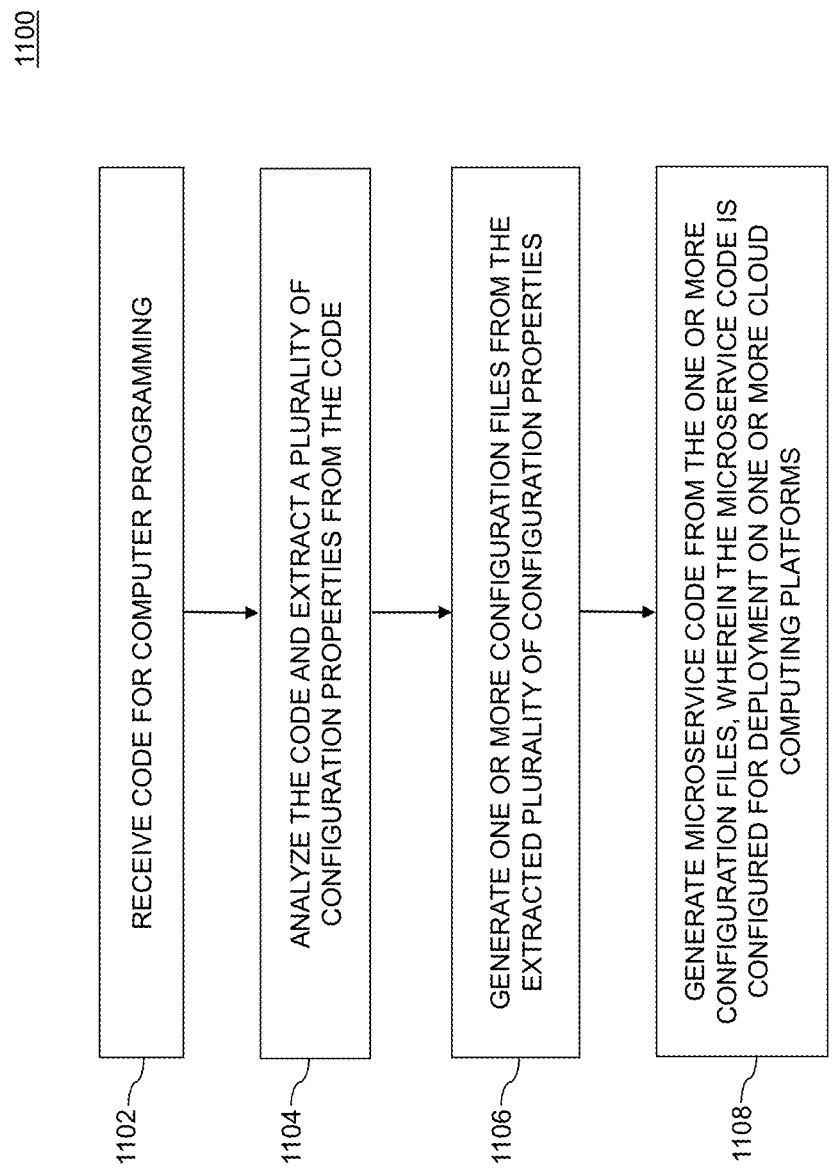
FIG. 11 is a flow diagram of a process for generating code for deployment in a microservices-based cloud environment in an illustrative embodiment.

The operation of the information processing system 100 will now be described in further detail with reference to the flow diagram of FIG. 11. With reference to FIG. 11, a process 1100 for generating code for deployment in a microservices-based cloud environment as shown includes steps 1102 through 1108, and is suitable for use in the system 100 but is more generally applicable to other types of information processing systems comprising a microservices development platform configured for generating code for deployment in a microservices-based cloud environment.

In steps 1102 and 1104, computer programming code is received, the code is analyzed and a plurality of configuration properties are extracted from the code. Analyzing the code may comprise determining a granularity of one or more services in the code. Analyzing the code may also comprise determining at least one of enterprise logic, endpoints, data sources, messaging queues, web services and templates in the code.

In step 1106, one or more configuration files are generated from the extracted plurality of configuration properties. In step 1108, microservice code is generated from the one or more configuration files. The microservice code is configured for deployment on one or more cloud computing platforms.

The method may further include validating the generated microservice code prior to the deployment of the microservice code on the one or more cloud computing platforms. The validation may be based on a plurality of factors comprising at least one of: (i) a number of codebases for a plurality of microservices; (ii) whether dependencies have been declared; (iii) a storage location of one or more configurations; (iv) whether one or more backing services are treated as attached resources; (v) whether build and run stages are separated; and (vi) whether logs are produced as event streams.

The validating of the generated microservice code can include performing load testing, and analyzing a quality of the generated microservice code. The method can also include providing an interface to one or more users for retrieving the code from a codebase location.

Generating the microservice code from the one or more configuration files can include utilizing one or more templates from a template repository and/or utilizing one or more code snippets from a code snippet repository. Generating the microservice code from the one or more configuration files can also include providing placeholders in the microservice code for one or more microservice accelerators and/or providing for one or more connections to external systems in the microservice code. The one or more microservice accelerators can comprise at least one of a security accelerator, logging accelerator, testing accelerator, cloud platform configuration accelerator, auto-scaler rule accelerator and CI/CD accelerator.

It is to be appreciated that the FIG. 11 process and other features and functionality described above can be adapted for use with other types of information systems configured to execute microservices development services on a microservices development platform or other type of processing platform.

The particular processing operations and other system functionality described in conjunction with the flow diagram of FIG. 11 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 11 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a microservices development platform as disclosed herein can provide a number of significant advantages relative to conventional arrangements. For example, one or more embodiments are configured to provide a streamlined solution for conversion of code which is not cloud ready to a format for cloud deployment, and for bulk migration of legacy code. One or more embodiments use a vendor independent code generator to generate cloud native microservices from code which is not cloud ready. Advantageously, the embodiments also enhance existing microservice code by analyzing the code in connection with 12 Factor compliance. The embodiments also utilize machine learning to implement a service pattern-based and an enterprise integration pattern-based code generator.

Advantageously, the embodiments do not require a developer to have knowledge of legacy technology, require minimal coding skills and allow for efficient use of computational resources by reducing software development time. The embodiments also provide intelligent scaling capabilities to identify and configure the number of minimum or maximum resources.

The embodiments parse and analyze input code written in different languages and from various sources (e.g., Oracle Service Bus (OSB), WebSphere IIB, JAVA or .NET applications), and convert the code to microservices. Intelligent analysis and generation components of a microservices development platform convert complex enterprise logic to microservices by reading and parsing only configuration files to generate code validated by the 12-Factor methodology. The embodiments further support CI/CD processes and streamlined (e.g., one-click) deployment by permitting a user to select, with, for example, the click of a mouse on a user interface, the codebase location for the desired codebase that is to be converted to microservices. This selection can initiate the conversion process to generate microservice code for deployment on a cloud platform.

Unlike former approaches, the illustrative embodiments provide capabilities to convert existing legacy application code to optimized microservices, build the microservices according to the requirements of a target cloud platform and deploy the microservices to the cloud platform. The embodiments are configured to use enterprise integration patterns to generate the code, which can adequately address issues related to deduplication, strict ordering, monitoring, caching and other features.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the microservices development platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a microservices development platform in illustrative embodiments. These and other cloud-based systems in illustrative embodiments can include object stores.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
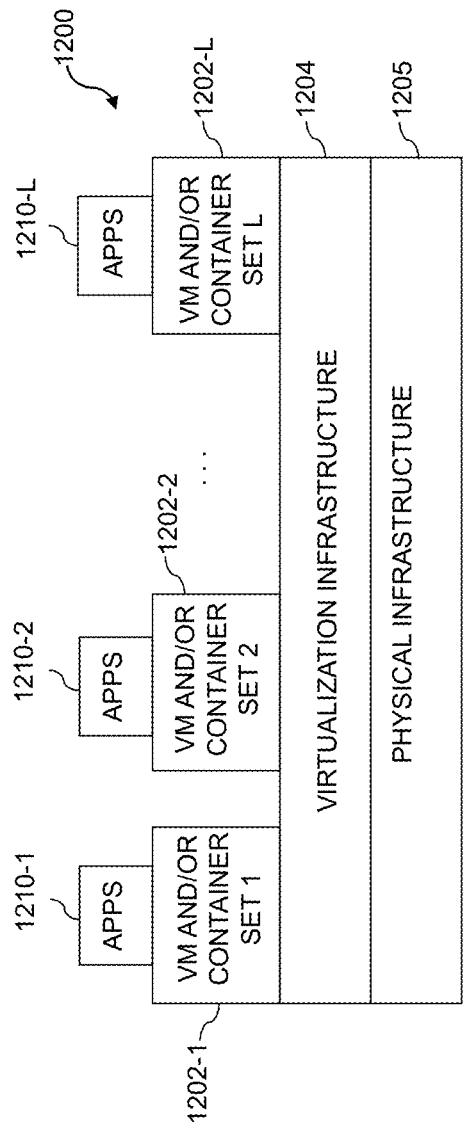
FIGS. 12 and 13 show examples of processing platforms that may be utilized to implement at least a portion of an information processing system in illustrative embodiments.
Figure 13:
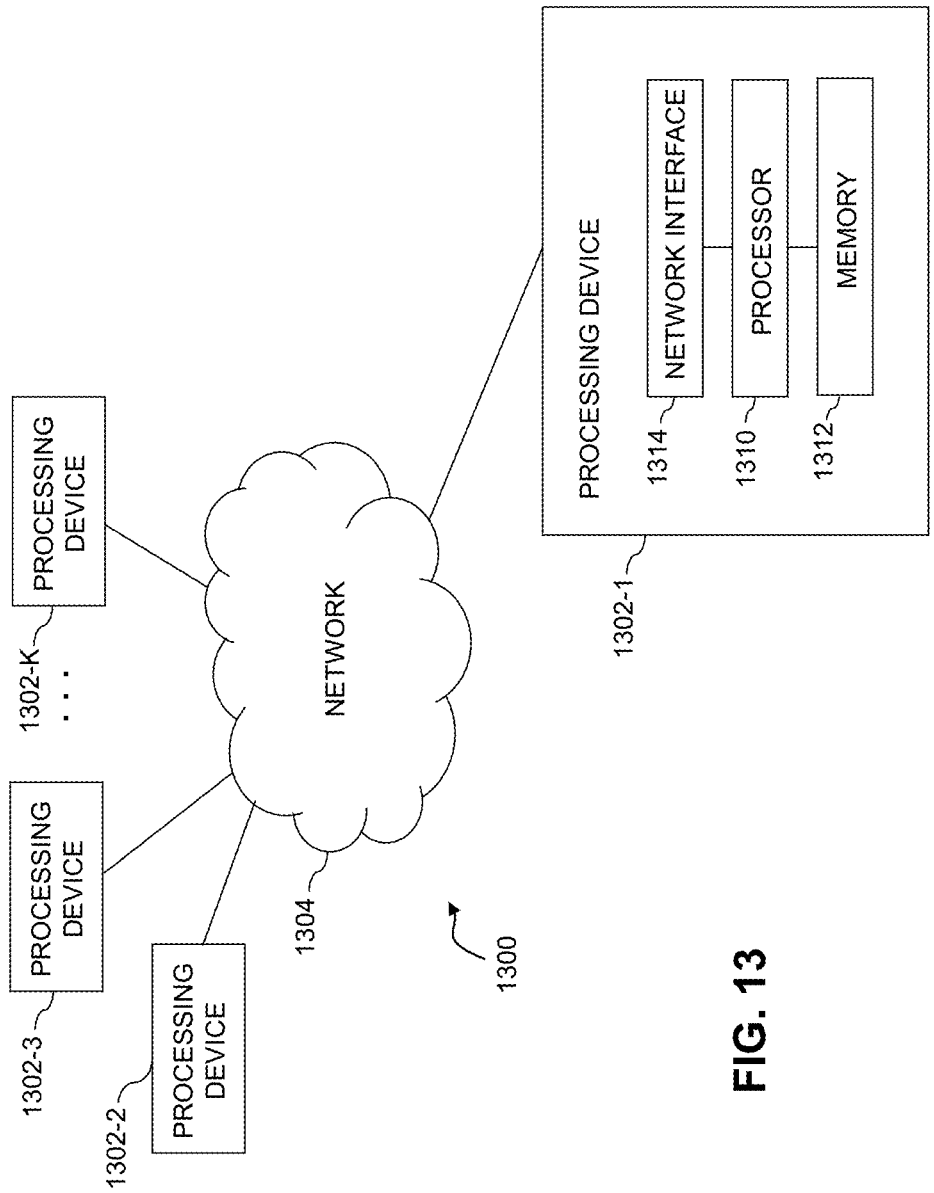

FIG. 12 shows an example processing platform comprising cloud infrastructure 1200. The cloud infrastructure 1200 comprises a combination of physical and virtual processing resources that may be utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13. The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312. The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the microservices development platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and microservices development platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices;
said at least one processing platform being configured:
to receive input code for computer programming;
to analyze the input code to determine one or more endpoints and extract a plurality of configuration properties from the input code, wherein the input code comprises legacy code convertible to microservice code for a cloud-based deployment;
to generate one or more configuration files from the extracted plurality of configuration properties; and
to generate the microservice code from the one or more configuration files and based, at least in part, on the one or more endpoints of the input code;
wherein the generated microservice code is configured for deployment on one or more cloud computing platforms;
wherein, in generating the microservice code from the one or more configuration files, said at least one processing platform is configured to provide placeholders in the microservice code for one or more microservice accelerators; and
wherein the one or more microservice accelerators comprise at least a scaler accelerator implementing at least one of functionality for dynamic scaling of system resources to dynamically adjust resource capacity in response to changes in utilization of one or more of the system resources, and functionality for predictive scaling of the system resources to forecast load of the system resources to generate scheduled adjustments to the resource capacity.

2. The apparatus of claim 1 wherein said at least one processing platform is further configured to validate the generated microservice code prior to the deployment of the generated microservice code on the one or more cloud computing platforms.

3. The apparatus of claim 2 wherein the validation is based on a plurality of factors comprising at least one of (i) a number of codebases for a plurality of microservices; (ii) whether dependencies have been declared; (iii) a storage location of one or more configurations; (iv) whether one or more backing services are treated as attached resources; (v) whether build and run stages are separated; and (vi) whether logs are produced as event streams.

4. The apparatus of claim 2 wherein, in validating the generated microservice code, said at least one processing platform is configured to perform load testing.

5. The apparatus of claim 2 wherein, in validating the generated microservice code, said at least one processing platform is configured to analyze a quality of the generated microservice code.

6. The apparatus of claim 1 wherein, in analyzing the input code, said at least one processing platform is configured to determine a granularity of one or more services in the input code.

7. The apparatus of claim 1 wherein, in analyzing the input code, said at least one processing platform is configured to further determine at least one of enterprise logic, data sources, messaging queues, web services and templates in the input code.

8. The apparatus of claim 1 wherein, in generating the microservice code from the one or more configuration files, said at least one processing platform is configured to utilize one or more templates from a template repository.

9. The apparatus of claim 1 wherein, in generating the microservice code from the one or more configuration files, said at least one processing platform is configured to utilize one or more code snippets from a code snippet repository.

10. The apparatus of claim 1 wherein the one or more microservice accelerators further comprise at least one of a security accelerator, logging accelerator, testing accelerator, cloud platform configuration accelerator and continuous integration (CI)/continuous delivery (CD) accelerator.

11. The apparatus of claim 1 wherein, in generating the microservice code from the one or more configuration files, said at least one processing platform is configured to provide for one or more connections to external systems in the microservice code.

12. The apparatus of claim 1 wherein said at least one processing platform is further configured:
to provide an interface to one or more users for retrieving the input code from a codebase location.

13. A method comprising:
receiving input code for computer programming;
analyzing the input code to determine one or more endpoints and extracting a plurality of configuration properties from the input code, wherein the input code comprises legacy code convertible to microservice code for a cloud-based deployment;
generating one or more configuration files from the extracted plurality of configuration properties; and
generating the microservice code from the one or more configuration files and based, at least in part, on the one or more endpoints of the input code;
wherein the generated microservice code is configured for deployment on one or more cloud computing platforms;
wherein generating the microservice code from the one or more configuration files comprises providing placeholders in the microservice code for one or more microservice accelerators;
wherein the one or more microservice accelerators comprise at least a scaler accelerator implementing at least one of functionality for dynamic scaling of system resources to dynamically adjust resource capacity in response to changes in utilization of one or more of the system resources, and functionality for predictive scaling of the system resources to forecast load of the system resources to generate scheduled adjustments to the resource capacity; and
wherein the method is performed by at least one processing platform comprising at least one processing device comprising a processor coupled to a memory.

14. The method of claim 13 further comprising validating the generated microservice code prior to the deployment of the generated microservice code on the one or more cloud computing platforms.

15. The method of claim 13 wherein generating the microservice code from the one or more configuration files comprises at least one of utilizing one or more templates from a template repository and utilizing one or more code snippets from a code snippet repository.

16. The method of claim 13 wherein generating the microservice code from the one or more configuration files comprises providing for one or more connections to external systems in the microservice code.

17. A computer program product comprising a non-transitory processor-readable storage medium having stored therein program code of one or more software programs, wherein the program code when executed by at least one processing platform causes said at least one processing platform:
to receive input code for computer programming;
to analyze the input code to determine one or more endpoints and extract a plurality of configuration properties from the input code, wherein the input code comprises legacy code convertible to microservice code for a cloud-based deployment;
to generate one or more configuration files from the extracted plurality of configuration properties; and
to generate the microservice code from the one or more configuration files and based, at least in part, on the one or more endpoints of the input code;
wherein the generated microservice code is configured for deployment on one or more cloud computing platforms;
wherein, in generating the microservice code from the one or more configuration files, the program code causes said at least one processing platform to provide placeholders in the microservice code for one or more microservice accelerators; and
wherein the one or more microservice accelerators comprise at least a scaler accelerator implementing at least one of functionality for dynamic scaling of system resources to dynamically adjust resource capacity in response to changes in utilization of one or more of the system resources, and functionality for predictive scaling of the system resources to forecast load of the system resources to generate scheduled adjustments to the resource capacity.

18. The computer program product according to claim 17, wherein the program code further causes said at least one processing platform to validate the generated microservice code prior to the deployment of the generated microservice code on the one or more cloud computing platforms.

19. The apparatus of claim 1 wherein, in receiving the input code, said at least one processing platform is configured to receive an identification of a codebase location from a user via a user interface, wherein the receiving of the identification triggers transmission of a version control system path and service identifier to a parsing service.

20. The method of claim 13 wherein receiving the input code comprises receiving an identification of a codebase location from a user via a user interface, wherein the receiving of the identification triggers transmission of a version control system path and service identifier to a parsing service.

\* \* \* \* \*